United States Patent
Vilkas et al.

[15] 3,702,915
[45] Nov. 14, 1972

[54] AUTOMATIC MELT-THRU WELDING METHOD AND APPARATUS

[72] Inventors: Eugene P. Vilkas, Los Angeles; Gasparas Kazlauskas, North Hollywood, both of Calif.

[73] Assignee: Astro-Arc Co., Sun Valley, Calif.

[22] Filed: Oct. 23, 1970

[21] Appl. No.: 83,415

Related U.S. Application Data

[63] Continuation-in-part of Ser. No. 884,572, April 9, 1969.

[52] U.S. Cl. ..................................219/137, 219/130
[51] Int. Cl. .................................................B23k 9/00
[58] Field of Search......219/130, 131, 137, 124–126; 250/220

[56] References Cited

UNITED STATES PATENTS

| | | |
|---|---|---|
| 3,062,950 | 11/1962 | Chyle ..........................219/127 |
| 3,496,327 | 2/1970 | Vilkas..........................219/127 |
| 3,303,340 | 2/1967 | Hewett et al...........250/220 C |
| 3,335,254 | 8/1967 | Vilkas et al................219/601 |
| 3,370,151 | 2/1968 | Normando..................219/131 |

*Primary Examiner*—J. V. Truhe
*Assistant Examiner*—Gale R. Peterson
*Attorney*—Robert E. Geauque

[57] ABSTRACT

The method of gas tungsten-arc welding wherein an optical sensor is employed to sense melt-thru weld completion and to transmit a signal to a controller effect a variation of the time of the welding current. An apparatus to effect the welding method of this invention comprising the mounting of the optical sensor interiorly of the workpiece at an angle of five degrees to forty five degrees from the weld with respect to the wall of the workpiece, the optical sensor operating through a controller to cause a variation in the welding time.

8 Claims, 4 Drawing Figures

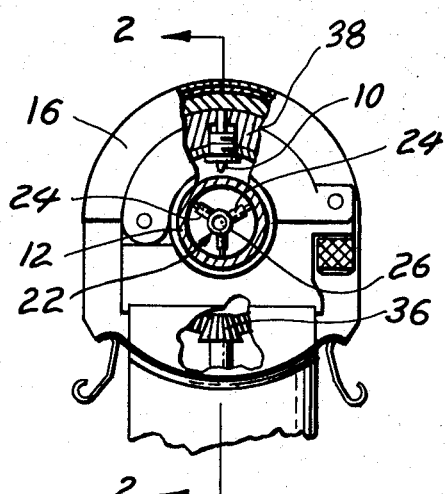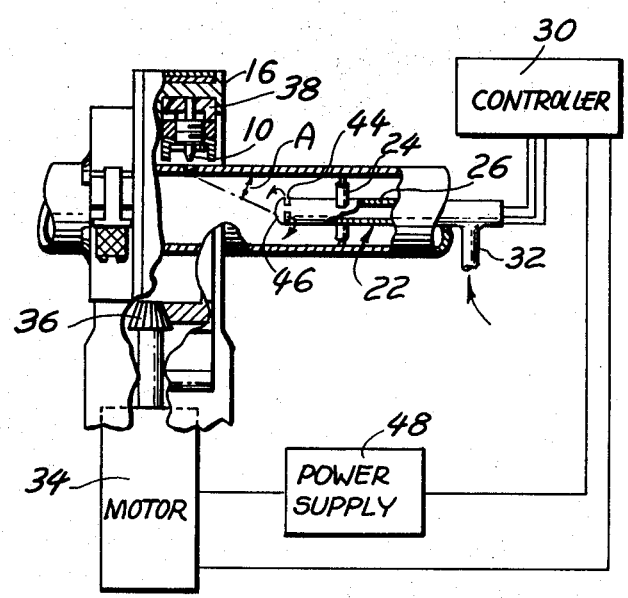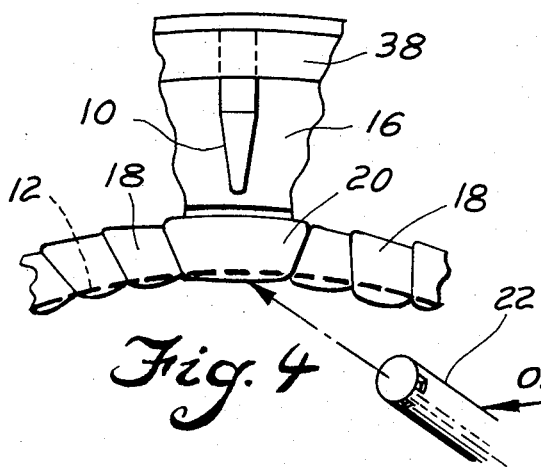

AUTOMATIC MELT-THRU WELDING METHOD AND APPARATUS

This patent application is a continuation-in-part of a patent application by the same applicants, Ser. No. 884,572, by the same title, filed Apr. 9, 1969.

BACKGROUND OF THE INVENTION

The field of this invention relates to the welding of separate metallic elements by the gas tungsten arc welding process in which the weld melts through on the interior side of the workpiece. More particularly the field of this invention contemplates an improved method and apparatus for automatic gas tungsten arc welding along the circumferential path in tubular structures as described in U.S. Pat. No. 3,400,237 to G. Kazlauskas and 3,335,254 to E. P. Vilkas et al.

In certain applications of thick walled tubing it is necessary to employ the melt-thru welding technique. While this technique can be accomplished with conventional welding equipment, the time required is prohibitive as to cost for making the great number of the required weld beads. Heretofore, there have been attempts at designing an automatic welding apparatus for the gas tungsten arc melt-thru method. However, there are many variables which must be contended with as: (1) The mating of the to be welded elements; (2) Tube wall thickness; (3) Physical changes of the tungsten electrode tip which changes the length of the arc; and (4) Fluctuations of the electrical equipment. Usually such automatic systems have attempted to overcome the above difficulties by varying the magnitude of the welding current. There is only one specific weld current per type of thickness of material at which maximum weld efficiency is achieved with maximum quality. Therefore, to vary the welding current thereby forces a compromise of the efficiency and quality.

SUMMARY OF THE INVENTION

The method of welding of this invention employs the use of a controller which is to vary the time of application of the welding current. One way in which the welding time can be effectively varied is by employing the use of welding current pulses. Welding current pulses relate to applying a weld upon the workpiece at a particular location. A second weld is then applied at a location spaced from the first weld bead. The resulting weld beads overlap each other, thereby forming a continuous connection. This welding procedure is repeated until the connection is completed. In essence, the welding current is applied sporadically as to time in the form of pulses. Each pulse is to produce a welding bead upon the workpiece. A controller apparatus which is employed to effect the method of this invention is to control the time of each pulse, so that each weld bead that is produced is substantially identical to each other weld bead regardless of changing conditions in the workpiece or the welding equipment, with the entire weld being of the highest quality. Current pulses produce melt-thru welds by either starting and stopping of the welding electrode, or it is possible to effect a series relationship without a complete stopping of the welding electrode. For example, the electrode may be moved continuously about the workpiece with the speed of the electrode movement determining the overlap of the melt-thru welds as illustrated in FIG. 4.

The controller apparatus of this invention which is to effect the welding method of this invention includes the use of mounting an optical sensor interiorly of the workpiece. The sensor is to observe the melt-thru of the weld and it has been found the sensor must be mounted within the range of 5° to 45° from the welding point with respect to the wall of the workpiece. Such mounting avoids direct glare from the weld which occurs between 45° and 90°, such direct glare giving undesirable results. From the optical sensor an electrical signal is transmitted, upon melt-thru being achieved, to an amplifying assembly. It is the function of the amplifying assembly to compare the signal from the sensor to a preadjusted electrical signal which has been determined in view of the type of material being welded. Such is necessary as different materials emit different degrees of brightness during welding and as brightness increases be does the electrical signal from the optical sensor. Upon a predetermined amount of melt-thru being ascertained by the amplifier assembly, a silicon rectifier is activated which causes activation of an operating relay and a timer relay. The operating relay activates a switching assembly which lowers the welding current to a non-welding level. Also, the welding electrode is caused to moved moved with respect to the workpiece. The timer relay has been preset to maintain this established condition for a set period of time. At the end of the period of time the timer relay causes opening of a switch which causes welding current to be returned to the normal welding level. Also, the electrode is no longer moved with respect to the workpiece.

BRIEF DESCRIPTION OF THE DRAWINGS

FIG. 1 is a partly cut-away view of a known welding head for automatic welding of tubular structures with which the apparatus of this invention is to be employed;

FIG. 2 is a partly-in-section view of the apparatus of FIG. 1, taken along line 2—2 of FIG. 1, showing broadly the controller apparatus of this invention and its cooperation with the known welding head;

FIG. 4 is a diagramatic view of the melt-thru weld beads which are produced by the pulse welding technique employed within this invention.

DETAILED DESCRIPTION OF THE SHOWN EMBODIMENT

Figure 3:
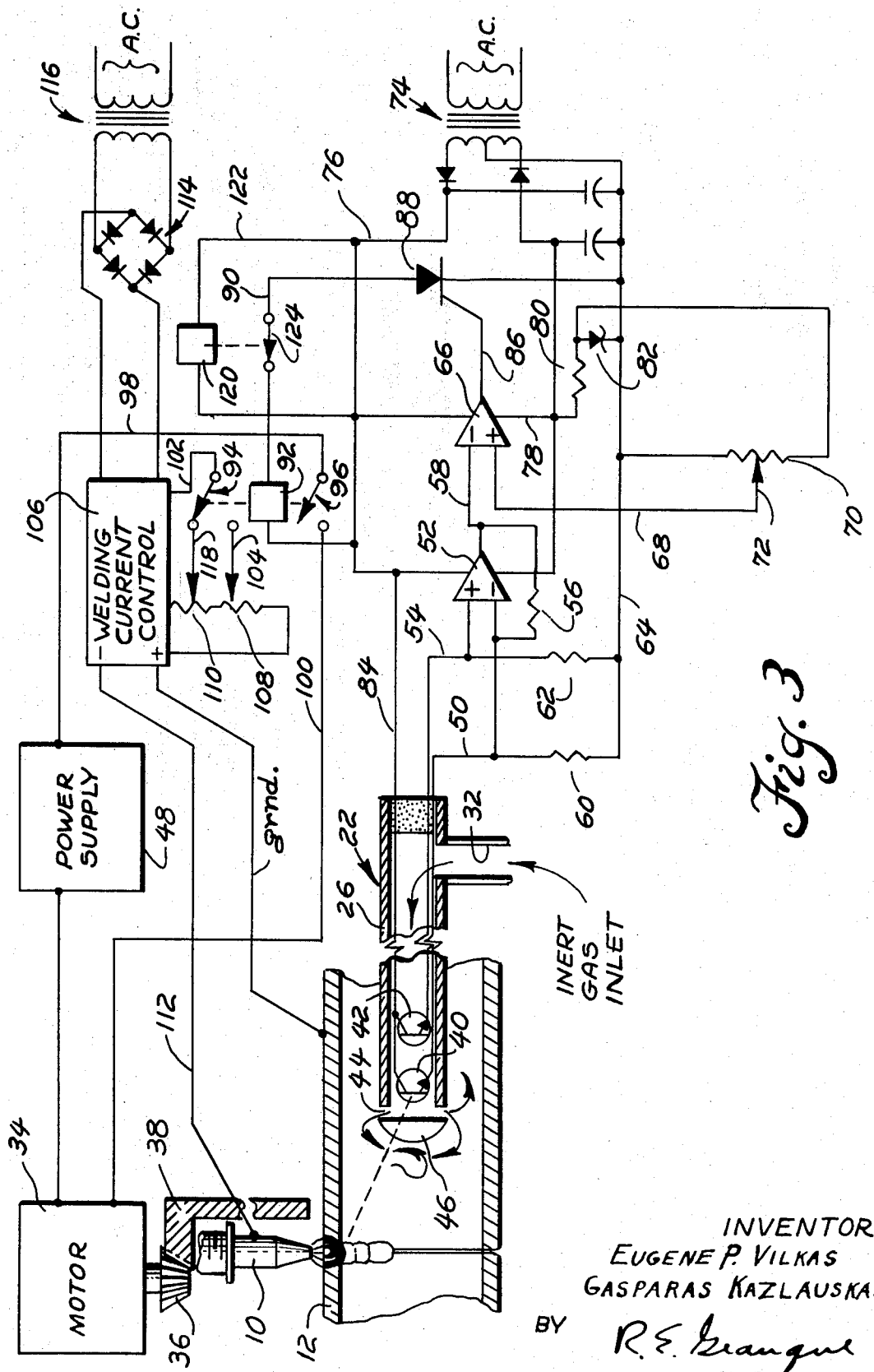
FIG. 3 is a schematic electrical diagram of the controller apparatus of this invention showing its relation to the electrode of the welding head of FIG. 1.

The tungsten arc pulse welding apparatus of this invention is influenced by controllable process variables and semi-controllable variables. The semi-controllable variables relate to the set up procedure of the workpiece such as the workpiece thickness, the joint to be welded, the heat energy characteristics of the workpiece, and the welding electrode tip characteristics. The controllable process variables relate to the arc voltage, the welding speed, the welding current, and the time of the welding. The actual process performance due to the semi-controllable variables is measured through the use of an optical sensor, this measurement being transmitted to a controller. The controller has been preprogrammed with the basic criteria of what is desirable in the welding process. The controller is adapted to vary the controllable process variables to maintain the welding process within the preprogrammed basic criteria. Heretofore, all known previous automatic welding control apparatuses control the welding current. Applicants, according to this invention, believe that it is best to vary the time of the welding current instead of the value of the welding current.

Shown in FIGS. 1 and 2 a welding head 16 is to be employed to effect welding of tubular workpieces. Within the welding head 16 is mounted a tungsten electrode 10 which is rotatable about the workpiece 12 by means of an indexed gear assembly 14, which is located within the welding head 16. The electrode 10 is moved about the workpiece 12 by means of a motor 34 which causes rotation of bevel gear 36. Bevel gear 36 operates upon ring gear 38 within which the electrode 10 is secured. For a more detailed explanation of the welding head apparatus shown in FIGS. 1 and 2 of the drawings, reference may be had to U.S. Pat. No. 3,400,237 to G. Kazlauskas.

The provision of Applicants invention over the welding apparatus of U.S. Pat. No. 3,400,237 is to the inclusion of an optical sensor 22 located interiorly of the workpiece 12. The optical sensor 22, which will be described in greater detail further on in the specification, is to be longitudinally movably supported within the tubular workpiece 12 as by spring biased arms 24. Arms 24 are equidistantly spaced about a sleeve 26 which is to support the sensor 22. The biasing arm arrangement is such to facilitate ease of supporting and retaining the sensor 22 within the various diameter workpieces 12, and to also facilitate ease of placement and removal of the sensor 22.

It has been found that direct glare from the weld can result in false readings by the sensor as to the stage of weld completion. This can be avoided by physically displacing longitudinally the sensor 22 from the weld area. It has been discovered that it is necessary for angle A to be within the range of 5° to 45° with respect to the wall of the workpiece 10 for the sensor to operate effectively. The produced electric signal from the sensor 22 is transmitted therefrom to the controller 30. Controller 30 then functions to vary the welding time as will become apparent in more detailed description of the controller further on in this specification. Another function of the sleeve 26 is to transmit shielding gas from a source (not shown) through an inlet 32. The gas, which is to be inert such as argon or helium, is to be conducted through the sleeve 26 around the photocells 40 and 42 and out through outlet orifice 44 located within sleeve 26. The outlet orifice 44 is located adjacent lens 46 which is located at the fore end of the sensor 22. Lens 46 is to be of conventional glass construction and is to function to effect concentration of light rays from the weld area as well as to protect the photocells 40 and 42 from contamination by foreign material. The flow of gas through the sleeve 26 prevents the sensor 22 from over heating and the weld from oxidation. Also, the flow of gas effects a cleaning of dust from the surface of lens 46 to insure unhindered transmission of light rays from the weld area through the lens 46.

The electrical signal from the photocells 40 and 42 is transmitted to a controller 30. The controller 30 in turn functions through power supply 48 to cause activation or deactivation of motor 34. Also, controller 30 is to be capable of placing the welding current at a high level or a low level. The controller 30, as will be described in detail within the following description, is to control the welding time with the welding occurring in pulses. In other words, the welding actually takes place with no movement occurring between the electrode 10 and and the workpiece 12. Upon melt-thru of the weld occurring within the workpiece 12, the welding current is lowered sufficiently to not effect the welding and at the same time the movement of the electrode 10 with respect to the workpiece 12 occurs. The movement is predetermined so that each produced weld bead 18 is in a connecting relationship with its adjacent weld beads. Weld bead 20 which is the last of a series of weld beads 18, overlaps with the next to the last weld bead 18 and the first weld bead 18.

The time to produce each weld bead 18 is varied by means of the controller 30 so that perfect welding of the workpiece 12 occurs with the variance only being due to the inherent physical differences of the workpiece and the equipment being employed.

It is to be understood that Applicants invention relates to a welding apparatus which controls the welding time, it preferably being that the welding time is caused by a series of pulses. However, it is to be considered within the scope of Applicants invention to provide continuous movement between the electrode 10 and the workpiece 12 with the speed of the continuous movement being regulated by controller 30.

For a detailed description of the controller 30, reference may be had in particular to FIG. 3 of the drawings. A similar controller mechanism is shown in U.S. Pat. No. 3,335,254 by E. P. Vilkas et al. However, the controller within U.S. Pat. No. 3,335,254 relates to the employment of an optical sensor interiorly of a tubular workpiece for controlling only the magnitude of the welding current. Applicants apparatus, by controlling the welding time, is to constitute a substantial improvement over the apparatus defined in U.S. Pat. No. 3,335,254.

Photocell 40 comprises a light sensitive transistor which is to vary the output of an electrical signal due to radiation of light through lens 46 from the weld area. The electrical signal from photocell 40 is transmitted by means of conductor 50 to a differential amplifier 52. Photocell 42 which is also a light sensitive transistor, transmits an electrical signal through conductor 54 also to differential amplifier 52. It is to be noted however that photocell 42 is not exposed to any radiation of light from the weld area. Only photocell 40 is exposed to the radiating light from the weld area. The reason for the employment of two separate photocells 40 and 42 is that, it is well known that the electrical signal emission from photocells can be varied by reason of exposure of the photocell to heat energy. Such variance is frequently called thermal drift. It is the function by employing two photocells 40 and 42, by permitting only photocell 40 to be exposed to light radiation from the weld area, and then permitting both photocells 40 and 42 to be exposed to the heat energy created within the workpiece 12, a comparison of such signals within the differential amplifier 52 causes the emitted signal therefrom to represent only the light radiation from the weld area. In essence, the signal from photocell 42 is subtracted from the signal from photocell 40. Theoretically, upon no welding occurring, the emitted resultant signal from amplifier 52 would be zero as the signals from each photocell 40 and 42 would be equal and subtracted for each other. A resistor 56 operates between conductor 50 and conductor 58, with conductor 58 transmitting the output signal from the amplifier 52. The function of the resistor 56 is to set the gain of the amplifier 52. It is to be noted that conductors 50 and 54 are connected through load resistors 60 and 62 respectively to zero potential conductor 64.

The resultant electric signal from amplifier 52, which is to be representative of the amount of brightness located at the weld area, is transmitted through conductor 58 to a second differential amplifier 66. Also being supplied to second differential amplifier 66 through conductor 68 is a fixed value of an electrical signal. This fixed value signal is supplied through the movable tap 72 from the variable resistor 70. The source of electrical energy to variable resistor 70 is transmitted from AC power input transformer 74 through conductors 76 and 78 to variable resistor 70. A resistor 80 is located within conductor 78. A zener diode 82 is electrically connected about variable resistor 70. It is the function of the zener diode 82 to regulate the voltage potential across variable resistor 70 at a fixed value. It is to be noted that the AC power input from transformer 74 is also supplied through conductor 76 to conductor 84, which supplies the input signal to photocells 40 and 42.

The function of the variable resistor 70 is to supply a signal through conductor 72 to differential amplifier 66 which is to be representative as to the type of material and the thickness of the material which is being welded. Each material exhibits a different brightness level during welding as compared to other materials. For example, the brightness level of welding of titanium is substantially greater than that of steel. Therefore if titanium is being welded as compared to steel, the variable resistor 70 should be adjusted so as to transmit a proportionately greater fixed value signal through conductor 68 to amplifier 66. Amplifier 66 compares the output signal from the differential amplifier 52 and the fixed value signal from the variable resistor 70. Upon a sufficient value of an output signal of the second differential amplifier 66 being transmitted into conductor 86, activation of silicon rectifier 88 occurs. Upon activation of silicon rectifier 88 an electric signal is transmitted through conductor 90 to relay 92. Relay 92 functions to activate switches 94 and 96. The activation of relay 92 causes conductors 98 and 100 to be electrically connected through switch 96. Through switch 94, due to activation of relay 92, conductors 102 and 104 are also electrically connected. By reason of connection of conductors 98 and 100, motor power supply causes activation of motor 34 which proceeds to move electrode 10 with respect to workpiece 12. By reason of the connection of the conductors 102 and 104, the welding current from the control section 106 is caused to pass through variable resistors 108 and 110. Because of the setting of the resistance level of resistors 108 and 110, the welding current which is supplied through conductor 112 to the electrode 10 is of such a value to not permit welding to take place. The DC current that is being supplied to the section 106 is being transmitted through rectifying bridge 114 from AC power input 116. It is to be noted upon deactivation of relay 92, connection of conductors 102 and 118 occurs. Conductor 118 is directly connected through the variable resistor 110 to the welding current control section 106. The selection of the resistance of the variable resistor 110 is such that to supply a desired amount of welding current to electrode 10. It is further to be noted that switches 94 and 96 at all times operate simultaneously. In other words with conductors 102 and 118 being connected through switch 94, switch 96 is in the open position not permitting passage of electric current from conductors 98 and 100. With conductors 102 and 104 being connected through switch 94, switch 96 is in the closed position permitting passage of electric current from conductors 98 to 100.

Upon activation of silicon rectifier 88, the electric signal therefrom, besides activating relay 92, causes activation of relay 120 by connection of conductors 90 and 122. Relay 120 is a timer relay which is activated after a preset length of time to effect opening of switch 124. Upon activation of switch 124, which is located within conductor 90, deactivation of relay 92 occurs. The reason for timer relay 120 is to control the distance of movement of electrode 10 about the workpiece 12. Let it be assumed that for the particular diameter of workpiece 12 and the type of material of the workpiece 12 which is being welded, it is desired that the electrode 10 be moved a distance of one-eighth of an inch from one current pulse to the next succeeding current pulse. The timing mechanism within timer relay 120 is then selected in view of the gearing arrangement 36 and 38 and the speed of the electric motor 34 so that the timer relay 120 is activated after an interval of time which results in the desired ⅛ inch movement. For example, it may have been determined that a one second time interval after activation of relay 120 is sufficient to cause movement of electrode 10 approximately one-eighth of an inch.

The operation of the controller apparatus 30 of this invention is as follows: The sensor 22 is located interiorly by means of spring bias arms 24 within the workpiece 12. Angle A is selected to be less than 45° but greater than 5°. The inert gas from the source is then supplied within inlet 32. The power from input 116 is then supplied to current control section 106. Also, from input 74 electric current is being supplied to photocells 40 and 42. It will be assumed that the switches 94 and 96 are in the position as shown in FIG. 3 of the drawings. Since there is sufficient current being supplied through conductors 102, 118 and 112 to electrode 10 to effect welding of the workpiece 12, upon melt-thru of the weld being observed through lens 46 by photocell 40, an electric signal is transmitted to differential amplifier 52. To compensate for the thermal drift, the signal from photocell 40 is compared with the signal of the dark photocell 42. The output signal from differential amplifier 52 is transmitted to a second differential amplifier 66. This output signal is compared to a preselected fixed value signal from variable resistor 70. The resultant output signal from the differential amplifier 66, upon reaching a predetermined magnitude, causes activation of silicon rectifier 88. The output electric signal from rectifier 88 is transmitted to cause activation of relay 92. Simultaneously with the activation of relay 92, relay 120 is activated as far as initiation of the timing mechanism associated with relay 120. Relay 92 causes switch 96 to move connecting conductors 98 and 100. As a result, an electric circuit is formed between the motor power supply 48 and the motor 34 resulting in activation of motor 34. Motor 34 causes rotation of bevel gear 36 which through ring gear 38 causes movement of electrode 10 with respect to workpiece 12. Simultaneously with the operation of switch 96, switch 94 is moved to connect conductors 102 and 104. Therefore, the electric current being supplied to electrode 10 through conductor 112 must be transmitted through variable resistors 108 and 110 which have been prepositioned to determine the level of welding current and the level of non-welding current. As a result of the placing of resistors 108 and 110 in series between power input 116 and conductor 112, the level of the welding current being supplied to electrode 10 is insufficient to effect welding. This situation is desirable during movement of the electrode from a welding pulse to the next succeeding welding pulse position.

Upon the electrode 10 being moved the desired amount which has been measured by means of the timing relay 120, relay 120 is activating opening switch 124. As a result of switch 124 opening, deactivation of relay 92 occurs. As a result of the deactivation of relay 92, switch 96 is opened resulting in deactivation of motor 94. Electrode 10 is then positioned in a non-moving relationship with respect to workpiece 12. Also, upon deactivation of relay 92, switch 94 moves connecting conductors 102 and 118 which causes the welding current to be conducted only through variable resistor 110. Because of the substantially less resistance within the circuit, a substantial higher current level is being supplied to electrode 10 which is capable of effecting welding of the workpiece 12. The cycle is again repeated upon melt-thru being observed by sensor 22 of the succeeding weld pulse.

It is to be understood that electric motor 34, instead of being regulated in an on-off manner, could be regulated as to decreasing or increasing in velocity. If the electric motor 34 was operating continuously but only as to variation of speed, it is to be readily apparent that the welding current would be maintained constant at a welding level and not variable or movable to a non-welding level.

To be located within the welding current control section 106 is a timing mechanism which has been pre-set at a set value. The purpose of the timing mechanism is that in case a film of dust does accumulate upon lens 46 precluding sufficient entrance of light to cause activation of photocell 40, to prevent the spoiling of the work due to excess welding, the timing mechanism within the control section 106 will cause activation of relays 92 and 120. This last mentioned timing mechanism is to be pre-set at a particular value in view of the workpiece thickness and the type of workpiece material so as to prevent destruction of the material in the event of inactivation of sensor 22.

What is claimed is:

1. In combination with a welding apparatus including a power supply wherein the welding electrode is movable by a first means in respect to a workpiece, and optical sensor to observe the weld melt-thru and to transmit an electrical signal to a controller in response to weld melt-thru, the improvement comprising:

said controller, connected to said power supply, said controller includes second means for actuating said first means, said controller includes third means for controlling said power supply for maintaining the welding constant during welding, said first means being operatively connected to said second means, said sensor being connected to said second means, thereby controlling the length of time said electrode is fixed in a particular position thereby controlling the welding time.

2. Apparatus as defined in claim 1 wherein:

said sensor includes a first light sensitive element and a second light sensitive element, said first element being subjectable to light produced by welding, said second element being substantially unaffected by the light produced from welding, said first and second elements being subjected to substantially the same temperature;

fifth means for storing a fixed value; and said first means includes first differential means to compare the produced electrical signals from said first and second elements, an output signal being produced from said differential means directly dependent upon the produced electrical signals from said first and second elements.

3. In combination with a welding apparatus including a power supply wherein the welding electrode is movable by a first means in respect to a workpiece, an optical sensor to observe the weld melt-thru and to transmit an electrical signal to a controller in response to weld melt-thru, the improvement comprising:

said controller connected to said power supply, said controller includes a second means for actuating said first means, said controller includes third means for controlling said power supply for maintaining the welding current constant during welding, said first means being operatively connected to said second means, said sensor being connected to said second means, thereby controlling the length of time said electrode is fixed in a particular position thereby controlling the welding time;

said first means comprises a motor assembly to effect movement of said electrode with respect to said workpiece; and said third means being connected to said sensor for causing transmission of insufficient electrical current to said welding electrode to effect welding upon said motor assembly being activated.

4. Apparatus as defined in claim 3 wherein:

said sensor includes a first light sensitive element and a second light sensitive element, said first element being subjectable to light produced by welding, said second element being substantially unaffected by the light produced from welding, said first and second elements being subjected to substantially the same temperature;

fifth means for storing a fixed value; and said third means includes first differential means to compare the produced electrical signals from said first and second elements, an output signal being produced from said differential means directly dependent upon the produced electrical signals from said first and second elements.

5. Apparatus as defined in claim 4 wherein:

said output signal being transmitted to a second differential means, said second differential means connected to said first differential means for effecting comparison of said output signal with said fixed value signal, the resulting output signal from said second differential means being capable of causing activation of said motor assembly.

6. Apparatus as defined in claim 5 wherein:
a timing apparatus interconnected between said third means and said motor assembly such that said resulting output signal will cause the activation of and timing apparatus which in turn will activate said motor assembly.

7. In a method of melt-thru welding of tubular structure with a gas tungsten-arc wherein current pulses are employed to produce melt-thru weld beads, an automatic method of controlling the size of each weld bead comprising:
optically sensing each melt-thru weld and transmitting an electrical signal to a controller, the controller maintaining the melt-thru of each weld bead constant by varying the welding time on each weld bead; and
the step of transmitting also includes varying the welding time by moving the welding electrode with respect to the workpiece, causing deactivation of the welding procedure during movement of the welding electrode.

8. The method as defined in claim 7 wherein prior to the step of transmitting and after the step of sensing:
causing emission of an electrical signal upon melt-thru being achieved; and
comparing the signal with a fixed value signal.

* * * * *